US010308739B2

(12) United States Patent
Gao et al.

(10) Patent No.: US 10,308,739 B2
(45) Date of Patent: Jun. 4, 2019

(54) METHOD FOR PREPARING POLYVINYL CHLORIDE BY SUSPENSION AND POLYMERIZATION, AND FEEDING DEVICE (71) Applicant: Amos Chemicals Inc., Jericho, NY (US)

(72) Inventors: Yuhai Gao, Qingdao (CN); Xianzhen Zhuo, Qingdao (CN)

(73) Assignee: Amos Chemicals Inc., Jericho, NY (US)

( * ) Notice: Subject to any disclaimer, the term of this patent is extended or adjusted under 35 U.S.C. 154(b) by 65 days.

(21) Appl. No.: 15/533,605

(22) PCT Filed: Feb. 11, 2015

(86) PCT No.: PCT/CN2015/072812
§ 371 (c)(1),
(2) Date: Jun. 6, 2017

(87) PCT Pub. No.: WO2016/106964
PCT Pub. Date: Jul. 7, 2016

(65) Prior Publication Data
US 2017/0349680 A1 Dec. 7, 2017

(30) Foreign Application Priority Data
Dec. 31, 2014 (CN) .......................... 2014 1 0853196

(51) Int. Cl.
*C08F 114/06* (2006.01)
*B01J 4/00* (2006.01)
(Continued)

(52) U.S. Cl.
CPC .............. *C08F 114/06* (2013.01); *B01J 4/00* (2013.01); *B01J 4/001* (2013.01); *C08F 2/01* (2013.01); *C08F 2/20* (2013.01); *C08F 14/06* (2013.01)

(58) Field of Classification Search
CPC ............ C08F 2/18; C08F 114/06; B01J 4/001
(Continued)

(56) References Cited
U.S. PATENT DOCUMENTS 4,710,551 A * 12/1987 Miyata .................... C08F 14/06
526/140
2009/0292091 A1 * 11/2009 Benetta ................... C08F 14/06
526/191

FOREIGN PATENT DOCUMENTS

CN 101589069 A 11/2009
CN 102492066 A 6/2012
(Continued)

OTHER PUBLICATIONS

Chinese Search Report for Application No. 2014108531969, "Polyvinyl chloride suspension polymerization preparation method and feeding device", dated Apr. 5, 2017.
(Continued)

Primary Examiner — Fred M Teskin
(74) Attorney, Agent, or Firm — Hamilton, Brook, Smith & Reynolds, P.C.

(57) ABSTRACT

The present invention provides a production method of polyvinyl chloride by suspension polymerization and a feeding apparatus. This method comprises: Step 1: injecting a vinyl chloride monomer and water at 25-98° C. into a reaction vessel to obtain a water suspension, closing the reaction kettle, repeatedly and cyclically performing vacuum-pumping and cleansing with nitrogen, stirring and evacuating oxygen in the reaction kettle; Step 2: adding a first suspension agent and a second suspension agent into the reaction kettle, and then adding a nanopowder and an initiator composite, to carry out the polymerization reaction; Step 3: adding cold water to terminate the polymerization reaction upon the pressure in the reaction kettle is reduced to 3.5 bar or less; Step 4: evacuating and vacuumizing the
(Continued)

reaction kettle, and then filtering, washing and drying the resulted polymer, to obtain polyvinyl chloride. The present invention also provides a feeding apparatus used for the above production method. Polyvinyl chloride produced by the method of this invention has good performance and can meet the requirements of physical and chemical properties and applicability for most applications.

20 Claims, 3 Drawing Sheets

(51) Int. Cl.
*C08F 2/01* (2006.01)
*C08F 2/20* (2006.01)
*C08F 4/08* (2006.01)
*C08F 4/30* (2006.01)
*C08F 14/06* (2006.01)

(58) Field of Classification Search
USPC .............................. 526/84, 202, 344.2, 214
See application file for complete search history.

(56) References Cited

FOREIGN PATENT DOCUMENTS

| CN | 104028173 A | 9/2014 | |
|---|---|---|---|
| CN | 204365250 U | 6/2015 | |
| EP | 0623632 A2 * | 11/1994 | ................ C08F 2/18 |

OTHER PUBLICATIONS

International Search Report for International Application No. PCT/CN2015/072812, "Method for Preparing Polyvinyl Chloride by Suspension and Polymerization, and Feeding Device", dated Sep. 25, 2015.

* cited by examiner

METHOD FOR PREPARING POLYVINYL CHLORIDE BY SUSPENSION AND POLYMERIZATION, AND FEEDING DEVICE

RELATED APPLICATIONS

This application is the U.S. National Stage of International Application No. PCT/CN2015/072812, filed on Feb. 11, 2015, which designates the U.S., published in Chinese, and claims priority under 35 U.S.C. § 119 or 365 to China, Application No. 201410853196.9, filed Dec. 31, 2014. The entire teachings of the above applications are incorporated herein by reference.

FIELD OF TECHNOLOGY

The present invention relates to a production method of polyvinyl chloride by suspension polymerization and a feeding apparatus thereof, belonging to the technical field of polyvinyl chloride synthesis.

BACKGROUND ART

In prior art, vinyl chloride is polymerized by using a suspension method, and organic catalysts, such as peroxides, azo compounds or protective colloids, such as gelatin, methylcellulose and polyvinyl alcohol, are commonly used in the process. The quality of the suspension polymer prepared according to the existing technical procedures does not sufficiently satisfy the production and application engineers, especially in terms of the thermal stability, and a large amount of heat stabilizer is required during the modification process of polyvinyl chloride (PVC), wherein the heat stabilizer is predominantly a lead-containing product.

In fact, the main ingredients (vinyl chloride VCM, water, auxiliaries) added for the standard suspension PVC polymerization process has been foreseen prior to the start of the polymerization. At the start of the polymerization reaction, a sufficient amount of initiator is required to be added to activate the reaction and continue to be added until the reaction is completed within the predetermined procedure time. The most commonly used initiators are organic peroxides (different types, various properties) with good effects, but at the same time, some of the key defects will also affect the processing performance and quality of the finished PVC.

The suspended polyvinyl chloride (S-PVC) in the industry is currently and mainly produced by suspension polymerization via a batch feed process using a stainless steel autoclave. VCM is polymerized in accordance with the mechanism of free radical, and monomers are added into the reaction autoclave as liquid form. The water phase includes desalted water, dispersants (protective colloids, surfactants), buffer salts, and usually further includes defoamers, the water phase are finally dispersed into small droplets by continuous stirring.

After the initiator is added, the polymerization reaction is started, and the initiator is dissolved in the organic VCM phase. During polymerization, the medium must be continuously stirred. Thus, the polymerization is carried out only between VCM droplets. The reaction is carried out at a constant temperature of 35-75° C. under saturated vapor pressure of VCM. Eventually, the polymerization of VCM ceases after the addition of the killing agent capable of capturing free radicals. In general case, according to the production configuration and operating characteristics, the average conversion rate between VCM and finished PVC is 82-86%. Moreover, killing agents are a class of chemical products at higher prices.

The morphology of suspended PVC and the microstructure of S-PVC particles depend primarily on the polymerization temperature, the types and amounts of dispersants, the type of stirrer and stirring conditions.

The types of dispersants used also greatly determine the morphology of the PVC, because the dispersants can prevent the aggregation of the monomer VCM droplets during the polymerization reaction. Commonly used dispersants are partially water-soluble polymers such as cellulose derivatives and partially alcoholized polyvinyl alcohols (commonly referred to as PVAs). PVAs with different alcoholysis degrees are widely used and commonly can be used for commercial production of S-PVC. The alcoholysis degrees and molecular weights of PVAs determine their protective behaviors and the final sizes, shapes, and pores (morphology) of the polymer particles. The distribution of PVAs on the surface of VCM droplets depends on their alcoholysis degrees. The "primary" dispersant controls the size of polymer particles, and such PVAs are block copolymers having high alcoholysis degrees and having medium and high molecular weights, in general, their alcoholysis degree is generally more than 70%. On the other hand, the "secondary" dispersant mainly controls the pores of the polymer particles. PVAs serving as the secondary dispersant belong to random copolymers, having medium alcoholysis degrees generally in a range of 20-60%, with lower molecular weights.

Initiators commonly used in VCM polymerization reaction are generally different types of organic peroxides and azo compounds, solid long-chain hydroxy peroxydicarbonate salts, such as diacetoxy dicarbonates or perbismyristates, which are mainly formulated into water suspensions and widely used due to the stability and ease of operation. A certain amount of initiator has high repeatability/reproducibility after being added to a reaction kettle, and because of its very low solubility in water, a hard shell would be formed mostly at the surface of the reaction kettle.

At present, an increasing number of solid peroxy decarbonate salts are replaced with liquid peroxy decarbonate salts. Liquid peroxy decarbonate salts are cheaper, and can dissolve in VCM more quickly. But there is a high risk of explosion, so the operation must be careful, which becomes a daily problem in the industry.

The performance of organic peroxides mainly depends on the decomposition rate, which is expressed by the half-life at a specific temperature. As described above, the two or more initiators of different types are often used in combination due to the difference in polymerization temperature.

When PVC having a high K value (K80 to K100) is to be produced, the polymerization temperature is below 50° C. Rapid initiators such as biisobutyryl peroxides are often used to enhance the slow initiation rates caused by low polymerization temperatures. Such initiators are often used in combination with slightly slower initiators such as biisobutyryl peroxides. Rapid initiators and peroxy decarbonate salts are often used after mixing for the PVC having a K value between 70-80.

S-PVCs of specification between K50-K70 are produced using peroxy decarbonate salts, neutral reactive peresters and diacyl peroxides or using these initiators in combination. In the initial stage of the initiation phase, the droplets of the initiator rapidly disappeared because the initiator diffused into the VCM droplets and then aggregated. From the initial stage of the polymerization process until the conversion rate of 15%, the monomer droplets are dispersed and aggregated again, such that the initiator was evenly distributed between the VCM droplets.

The distribution of the initiator on the VCM droplets would affect the morphology of the finished S-PVC particles. If the initiator is not evenly distributed on each VCM droplet, particles with no pores are formed, which are referred to as plasticized particles. These non-porous particles have vitreous properties and high densities, and are almost spherical. Compact vitreous particles are difficult to process. Due to the lack of pores, intakes of plasticizer and stabilizer are very little, resulting in that these particles are not easy to be gelatinized and moulded during the process of processing. The presence of these particles leads to visible defects at the surface of finished S-PVC, i.e., so-called "fish eye".

The production of these nonporous vitreous particles originates from presence of the large amount of initiator droplets inside the polymerization reaction, replacing the conventional polymerization between VCM droplets. When the initiator is not sufficiently dispersed in the aqueous medium, the initiator droplets having a wide particle size distribution are formed. Under normal circumstances, the small initiator droplets will disappear quickly due to condensation with larger VCM droplets. However, the presence of larger VCM droplets is due to the fact that the fusion of smaller VCM droplets with these initiator droplets produces an opposite effect. The amount ratio of a small amount of VCM droplets and a large number of initiator droplets determines the polymerization change within the initiator droplets and the formation of these vitreous particles.

Another existing major problem is that these vitreous particles have poor thermal stability. This phenomenon is very likely to result from impact of the polymer chain with the initiator debris caused by the lack of monomer and thus leading to the formation of unsaturated structure.

The initiator residues present in the PVC would also affect the degradation of the polymer during processing. Under the condition of high temperatures required for the processing, active free radicals will form, and dehydrochlorinationis is carried out by extracting H— from the polymer chain, resulting in the initial coloring of PVC products. If the peroxide is easily hydrogenated by the water present in the polymerization system (mainly occurred during the later stage of the polymerization), the degradation of the PVC during processing will decrease due to the less residual amount of initiator in the material.

SUMMARY OF THE INVENTION

In order to solve the above-mentioned technical problems, it is an object of the present invention to provide a production method of polyvinyl alcohol by suspension polymerization, and the obtained polyvinyl alcohol by this method has excellent performance and is produced at low cost.

In order to achieve the above object, the present invention provides a production method of polyvinyl chloride by suspension polymerization, comprising the steps of:

Step 1: injecting a vinyl chloride monomer and water at 25-98° C. into a reaction kettle to obtain a water suspension (i.e., a suspension of water and the monomer), closing the reaction kettle, repeatedly and cyclically performing vacuum-pumping and cleansing with nitrogen, stirring, to evacuate oxygen in the reaction kettle;

Step 2: adding a first suspension agent and a second suspension agent into the reaction kettle, and then adding a suspension stabilizer and an initiator composite, to carry out the polymerization reaction;

Step 3: adding a cold water to terminate the polymerization reaction when the pressure in the reaction kettle is reduced to 3.5 bar or less;

Step 4: evacuating and vacuumizing the reaction kettle, and then filtering, washing and drying the resulted polymer, to obtain polyvinyl chloride.

In the above production method, the first suspension agent used is a polyvinyl alcohol having an alcoholysis degree of 95-66%, and the second suspension agent is a polyvinyl alcohol having an alcoholysis degree of 80-60%; moreover, the first suspension agent is added at an amount of 200-500 ppm, and the second suspension agent is added at an amount of 800-1000 ppm, in relative to the mass of the vinyl chloride monomer;

the starting materials of the initiator composite used include chloroformate, peroxide, organic acid anhydride and sodium hydroxide in a ratio by mass of 3-7:0.5-1.5:0.5-2:2-4 (preferably 5:1:1.5:3); the initiator composite is added at amount of 2700-3600 ppm, in relative to the mass of the vinyl chloride monomer;

the vinyl chloride monomer and water are in a ratio by mass of 1:3-1:0.5;

the used suspension stabilizer is added at an amount of 2800-3300 ppm.

In the above production method, the initiator composite used is an in situ initiator formed in the kettle, and is capable of initiating the in situ reaction of the VCM monomer to generate polyvinyl chloride, preferably, the initiator composite is added in two portions:

for the first time, 30% to 70% (preferably 50%) is added before the reaction: firstly adding a chloroformate and an organic acid anhydride, and then a peroxide and sodium hydroxide; for the second time, after the start of the reaction, the remaining initiator composite is added before the half-life of the previously added initiator composite: firstly adding the remaining chloroformate and the organic acid anhydride, and then (for example, within 2-3 hours) the remaining peroxide and sodium hydroxide.

During the process of adding the initiator composite, at the first time addition, chloroformate and an organic acid anhydride are firstly added, followed by peroxide and sodium hydroxide; after addition, the reaction of synthesizing PVC takes place; as the reaction proceeds, the initiator composite is gradually consumed, and then the remaining initiator composite is added (i.e., second time or successive addition); the second time addition is completed within 2-3 hours and the reaction is continued; when the VCM monomer concentration or pH in the reaction kettle is reduced to a certain extent, the reaction is terminated automatically and the pressure drop is about 2 kg; there is no need to add a polymerization killing agent (the cold water used in the present invention does not belong to the polymerization killing agent and is merely used for cooling). In this way, the progress of the reaction can be well controlled to maintain the exothermic equilibrium of the reaction such that the temperature of the circulating water is not excessively high, as a result, the polymerization reaction can be automatically terminated without adding the polymerization killing agent.

30-70% (preferably 50%) is added prior to the reaction, and the remainder is successively added after the initiation of the reaction. The subsequent addition of the remaining part of the initiator composite can be controlled to be within

2-3 hours, and the specific rate of addition can be controlled according to the type of reaction vessel.

In the above production method, the suspension stabilizer used may be an existing suspension stabilizer in the art; preferably, the suspension stabilizer is a mixed aqueous solution containing zinc oxide, a nanopowder and an organic acid salt compound, and the nanopowder contains magnesium hydroxide, aluminum hydroxide;

the amount of the magnesium hydroxide is 4-12% (preferably 7-8%), the amount of the aluminum hydroxide is 2-8% (preferably 4%), and the amount of the organic acid salt compound is 10-30% (preferably 20%), in relative to the weight of the suspension consisting of water and the monomer, and zinc oxide, the nanopowder and the organic acid salt compound are in a ratio by mass of 1:3:3.

The particle size of the above nanopowder is preferably in the range of from 600 to 200 nm.

According to a specific embodiment of the present invention, preferably, in the above suspension stabilizer, the organic acid salt compound used has a structural formula:

$M^{2+}$ represents a divalent metal cation selected from the group consisting of Mg, Ca, Zn, and Co;

$M^{3+}$ represents $Al^{3+}$ or $Bi^{3+}$;

$A^{n-}$ represents an anion having a valence of 1 to 4 and includes $HCO_3^-$, $Cl^-$, $CO_3^{2-}$ or $CH_3COO^-$;

x and y are numbers in the following ranges: $0.2<x<0.33$ and $y>0$.

In the above production method, the particle size of the nanopowder used is preferably in the range of from 600 to 200 nm.

In the above production method, preferably, the nanopowder further contains zinc oxide; more preferably, the ratio by mass of zinc oxide:magnesium hydroxide and/or aluminum hydroxide (i.e., the sum of the masses of magnesium hydroxide and aluminum hydroxide) is 1:3.

According to a specific embodiment of the present invention, the production method may further comprise the steps of adding a primary dispersant and a secondary dispersant; wherein, the primary dispersant is a polyvinyl alcohol having an alcoholysis degree of 80-72.5%; and the primary dispersant is added at an amount of 800-1500 ppm, in relative to the weight of the water suspension; the secondary dispersant is a polyvinyl alcohol having an alcoholysis degree of 35-55%. At the time of addition, the primary dispersant may be added in Step 1, the secondary dispersant may be added in Step 2, and the addition amount of the secondary dispersant may be determined appropriately according to needs.

In the above production method, preferably, the chloroformate has a molecular formula of $ClCOOR_1$, and $R_1$ is methyl, ethyl, isopropyl, m-propyl (m is preferably 1) or 2-ethylhexyl.

In the above production method, preferably, the organic acid anhydride has a molecular formula of $(RCO)_2O$, wherein R is methyl or ethyl; preferably, the organic acid anhydride comprises propionic anhydride, isopropionic anhydride or the like.

In the above production method, preferably, the peroxide is hydrogen peroxide and/or sodium peroxide.

In the above production method, by adding an initiator composite or the like into the reactant, it is possible to generate an initiation system in the reaction kettle, thereby enabling in-situ initiation of the monomer. Preferably, the starting materials of the initiator composite comprise ethyl chloroformate, hydrogen peroxide, propionic anhydride and sodium hydroxide.

In the above production method, preferably, the vinyl chloride monomer and water are in a ratio by mass of 1:1.

In the above production method, preferably, the temperature of water is 98-85° C., more preferably 95° C.

In the above production method, preferably, the first suspension agent is a polyvinyl alcohol having an alcoholysis degree of 88%, and the second suspension agent is a polyvinyl alcohol having an alcoholysis degree of 72%.

In the above production method, preferably, the vacuum-pumping treatment to the reaction kettle is carried out at 42-48 mbar (preferably 45 mbar), 33-37° C. (preferably 35° C.) for 45 minutes, the washing is carried out by using reverse osmosis water (reverse osmosis water treated to remove a variety of mineral impurities and metal ions, etc., and be able to bring better cleaning effect to create better reaction conditions for the polymerization), and the temperature for drying is 50-60° C. (preferably 55° C.).

According to a specific embodiment of the present invention, preferably, the production method further comprises the following steps:

prior to the addition of the first suspension agent and the second suspension agent, adding an anti-sticking-to-kettle agent, which can prevent the formation of a PVC hard shell on the inner wall during the process of polymerization, into the reaction kettle for treatment, wherein the anti-sticking-to-kettle agent may be a common anti-sticking-to-kettle agent in the art; closing the reaction kettle after injecting the polyvinyl alcohol solution and the reverse osmosis water, repeatedly and cyclically performing vacuum-pumping and cleansing with nitrogen (the pressure of vacuum-pumping can be controlled to 11 bar, and the nitrogen pressure for the cleansing can be controlled to 4 bar), stirring at a speed of 400 rpm and evacuating oxygen in the reaction kettle; adding an appropriate amount of vinyl chloride to remove the vacuum.

The present invention further provides a feeding apparatus for the above production method of polyvinyl chloride by suspension polymerization, which comprises: a peroxide vessel, a peroxide storage tank, a sodium hydroxide solution vessel, a sodium hydroxide solution storage tank, a chloroformate storage drum, an organic acid anhydride storage drum, a waste liquid tank, a washing tower, a box for automatic drums handling, and an inlet pipe for starting material water;

the peroxide vessel is connected to the peroxide storage tank by a first pump, and the peroxide storage tank is connected to the inlet pipe for starting material water by a first feeding pump;

the sodium hydroxide solution vessel is connected to the sodium hydroxide solution storage tank by a second pump, and the sodium hydroxide solution storage tank is connected to the inlet pipe for starting material water by a second feeding pump;

the chloroformate storage drum and the organic acid anhydride storage drum are arranged in the box for automatic drums handling, and the box for automatic drums handling is provided with an exhaust ventilation device, a blower and a vertical pump; the blower is connected to the washing tower and primarily plays a role of ventilation and exhaust; the vertical pump is connected to the waste liquid tank, and functions to collect and transfer the waste liquid to the waste liquid tank to keep the solution homogeneous without precipitation;

the chloroformate storage drum is connected to the inlet pipe for starting material water by a third feeding pump, and the organic acid anhydride storage drum is connected to the inlet pipe for starting material water by a fourth feeding pump;

one end of the inlet pipe for starting material water is used for inputting the starting material water and the other end thereof is connected to the top of the reaction kettle, and various starting materials can be brought into the reaction kettle through the input water;

the bottom of the washing tower is connected to the waste liquid tank;

the waste liquid tank is provided with a sodium hydroxide inlet pipe;

the waste liquid tank is connected to the outside of the apparatus by a fourth pump.

In the feeding apparatus provided in the present invention, a pipeline on top of the washing tower is connected to an incineration collection place outside, and a pipeline on the left side of the washing tower is connected to a waste liquid treatment device. The waste liquid tank serves to collect the waste liquid, and the fourth pump at the bottom of the waste liquid tank is connected to a press-filter device and is finally connected to a waste liquid treatment device outside.

The feeding apparatus provided in the present invention is mainly used for adding four starting materials of the initiator composite into the reaction kettle. The solutions of chloroformate, peroxide, an organic acid anhydride and sodium hydroxide are respectively put into separate vessels, and the timings and amounts of addition are controlled by a feeding pump.

PVC suspension polymerization can be carried out in a 1.0 Lt. stainless steel autoclave (a medium sized reaction kettle from Buchiglas AG, Switzerland), and the reaction kettle is designed to withstand an operating pressure of up to 200 bar and a maximum operating temperature of 300° C. The reaction kettle is equipped with an anchor stirrer, two thermocouples: one mounted inside the reaction kettle while being used as a baffle; the other one is fitted within a reaction kettle jacket. The temperature of reaction kettle is maintained by electric heating with a water cooling system, both inside the jacket. The temperature is controlled by using a proportional integral differential controller (T640 integrated loop processor) with an accuracy of +0.1° C. Two sampling drums are used to pressurize the reaction kettle or provide a vacuum. Parts in contact with VCM, such as pipes, sampling drums, valves, cylinders, etc., are purchased from Swagelok company; the reaction kettle vessel, cover, stirrer and baffle are made of AISI 316L stainless steel. The seal ring between the pressure vessel and the cover is made of PF 131, AS244.

The continuous feeding of the initiator system can be achieved by a computer-controlled reciprocating pump (i.e., feeding pump). The entire process can be controlled by a computer, and each of parameters can be set before the start of polymerization.

In the practice of the production method of polyvinyl chloride by suspension polymerization, it can be operated in the following manner:

the solutions of peroxide and sodium hydroxide are added to the peroxide vessel and the sodium hydroxide solution vessel, respectively, and when used, they are input into the peroxide storage tank and the sodium hydroxide solution storage tank respectively by the first pump and the second pump; when they are required to be added to the reaction kettle, solutions of peroxide and sodium hydroxide are added into the inlet pipe for starting material water respectively by the first feeding pump and the second feeding pump, and added through the inlet on top of the reaction kettle via the inlet pipe for starting material water;

chloroformate and the organic acid anhydride are stored in the chloroformate storage drum and the organic acid anhydride storage drum, respectively; when they are required to be added, chloroformate and the organic acid anhydride are added into the inlet pipe for starting material water respectively by the third feeding pump and the fourth feeding pump, and added through the inlet on top of the reaction kettle via the inlet pipe for starting material water;

when the material concentration in the box for automatic drums handling is too high, it can be adjusted by the blower and the exhaust ventilation device; the generated waste liquid is collected and injected into the waste liquid tank by the vertical pump, and is processed by the washing tower; the sodium hydroxide solution required for the washing tower is added through the sodium hydroxide inlet pipe; the pipe on top of the washing tower is connected to the incineration collection place for outputting the generated gas from washing; the bottoms of the waste liquid tank and the washing tower are connected to the waste liquid treatment device outside by the fourth pump for further processing of the waste liquid.

The method provided by the present invention is a novel method in which a reaction aid is continuously added at a certain time and the reaction is activated by a nano-based metal initiator generated in the reaction kettle, meanwhile a protective dispersant (e.g., PVA or the like) can serve to protect the aggregated PVC particles, and at the same time as the suspension polymerization of polyvinyl chloride, the properties of the polyvinyl chloride products are improved and the production cost is greatly reduced.

The polyvinyl chloride produced by the method of the present invention has good properties (thermal stability, etc.) and can meet the requirements of physical and chemical properties and suitability for most applications. By co-application of a nanopowder-containing heat stabilizer (Appak nano 1000) and an initiator system (Irispak 1000), the quality of finished PVC may be improved significantly, and the process also has a huge improvement.

In the production method provided by the present invention, a solution type initiator is added into an inert solvent or used as a dispersant suitable for the polymerization reaction system with being continuously added in time, it can be uniformly distributed on the VCM droplets in a very short period of time, instead of adding only the solid material having particles of different sizes at the initiate stage of the polymerization reaction.

The technical solution provided by the present invention can bring the advantages:

PVC Quality:

1) The quality of finished PVC is significantly improved in all general characteristics, such as high porosity and narrow particle size distribution.

2) A "pre-stable" PVC is obtained, which can be prepared for the "lead-free" environment during modification.

3) The thermal stability of the PVC obtained by the method of the present invention is significantly improved, and the cost of the stabilizer in the modification stage is reduced.

4) No buffer is needed, and the quantity of harmful salts in a finished PVC residue can be reduced, thereby improving the electrical properties of finished PVC.

PVC Process:

5) Standard peroxides which are expensive and hazardously operated are not used.

6) The reaction conversion rate can be increased by about 10% in the method of the present invention, as compared with that in the conventional standard reactions.

7) The final conversion rate has been greatly improved, with the result is the reduction of residual VCM needed to be treated and recovered, while the stripping process of VCM is alleviated.

8) The hydrochloric acid produced during the process of polymerization reaction is gradually neutralized by the formed catalyst, in this way, the reaction proceeds more regularly.

9) The low acidity of the reaction environment is favorable for the anti-sticking-to-kettle agent to exert its effect, and the hard shell formed on the inner wall of the reaction kettle is greatly reduced, allowing the reaction kettle to work continuously for more than 500 polymerization cycles without forming an obvious hard shell.

10) The amount of foam produced by the reaction is significantly reduced either in the reaction stage or in the final degassing/tripping stage.

11) The reaction is automatically controlled due to the immediate continuous feeding of the initiator, and the polymerization killing agent is no longer used in the final stage of the reaction.

Figure 1:
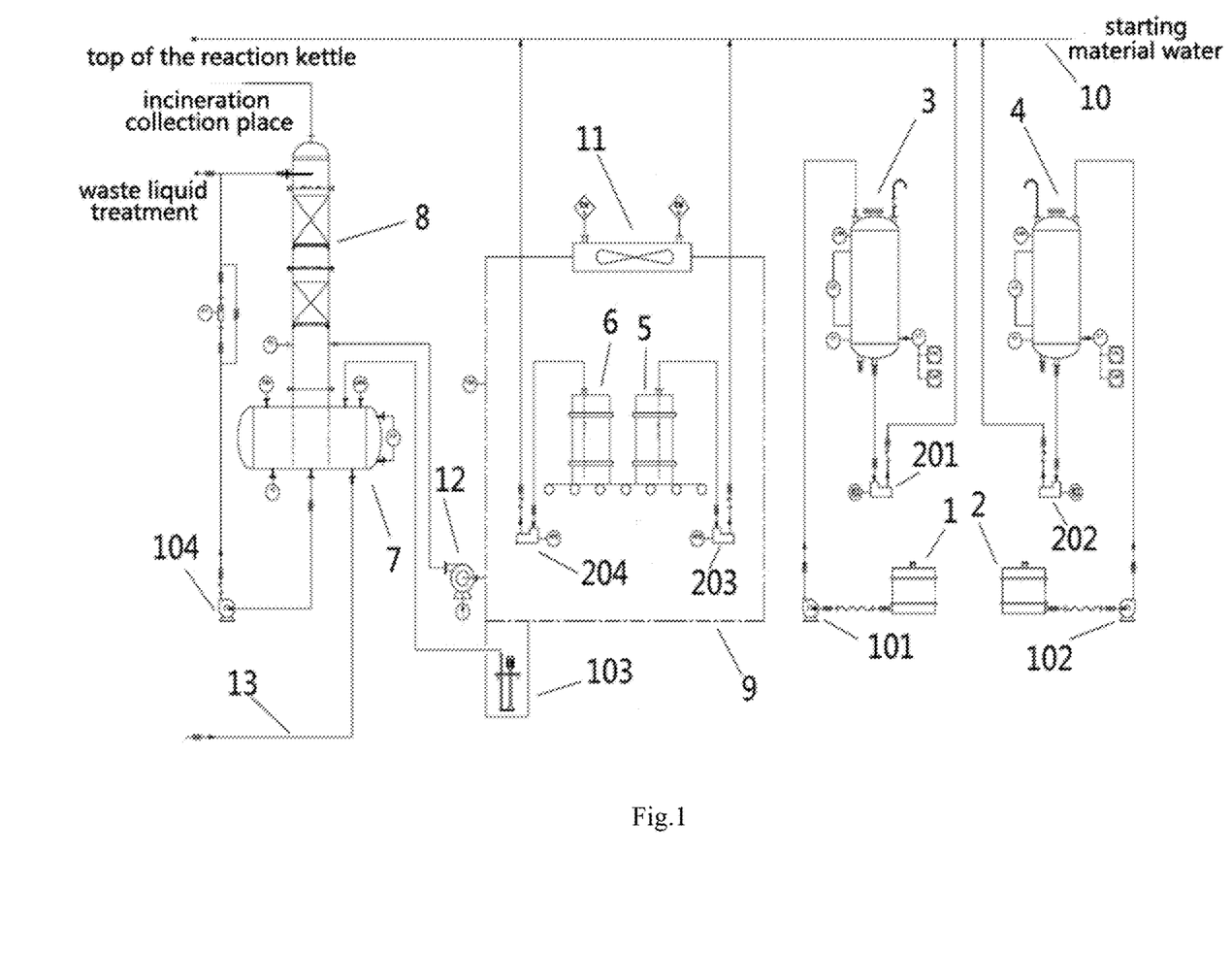
FIG. 1 is a structural schematic view of the feeding apparatus provided in Example 2.
Figure 2:
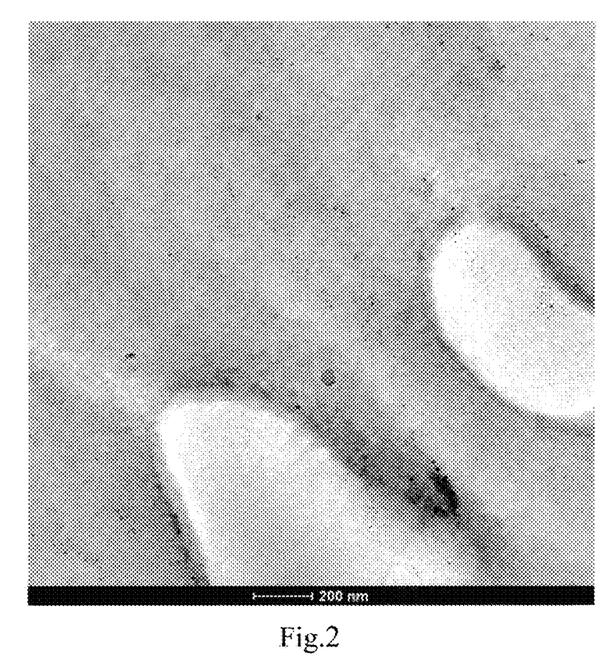
FIGS. 2-5 are transmission electron microscope photographs of the PVC produced in the examples.
Figure 3:
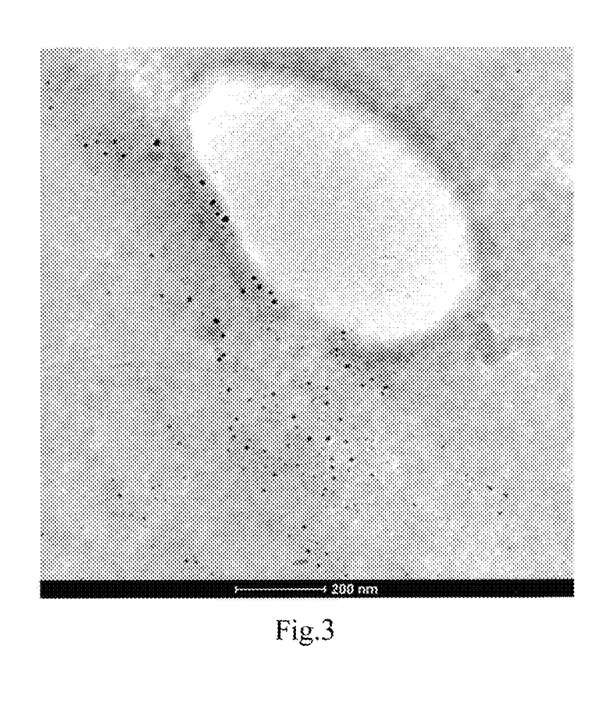
Figure 4:
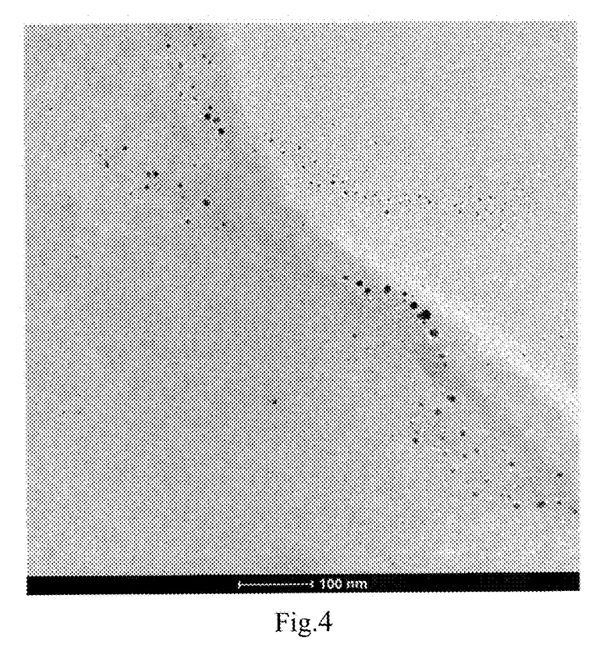
Figure 5:
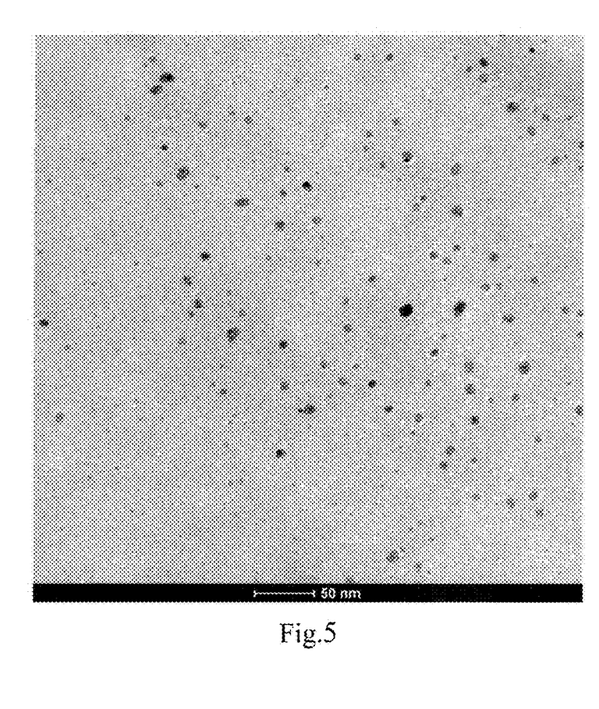

DESCRIPTION OF MAIN REFERENCE NUMBERS peroxide vessel 1, peroxide storage tank 2, sodium hydroxide solution vessel 3, sodium hydroxide solution storage tank 4, chloroformate storage drum 5, organic acid anhydride storage drum 6, waste liquid tank 7, washing tower 8, box for automatic drums handling 9, inlet pipe for starting material water 10, exhaust ventilation device 11, blower 12, sodium hydroxide inlet pipe 13, first pump 101, second pump 102, vertical pump 103, fourth pump 104, first feeding pump 201, second feeding pump 202, third feeding pump 203, fourth feeding pump 204

DETAILED DESCRIPTION OF EMBODIMENT

The technical solutions of the present invention will now be described in detail in order to provide a clearer understanding of the technical features, objects and advantages of the present invention, but are not to be construed as limiting the scope of the invention.

Example 1

This example provides a production method of polyvinyl chloride by suspension polymerization, which comprises the following steps:

adding an anti-sticking-to-kettle agent into a reaction kettle for treatment;

adding water and a VCM monomer into the reaction kettle to obtain a suspension of water and the monomer, and then closing the reaction kettle, repeatedly and cyclically performing vacuum-pumping (11 bar) and cleansing with nitrogen (4 bar), stirring at a speed of 400 rpm and evacuating oxygen in the reaction kettle;

to the reaction kettle, a first suspension agent (primary PVA1) and a second suspension agent (primary PVA2) are added, and then a suspension stabilizer (Appak Nano1000) and an initiator composite (Irispak system) are added, to carry out the polymerization reaction;

adding a cold water to terminate the polymerization reaction upon the pressure in the reaction kettle is reduced to 3.5 bar or less;

evacuating and vacuumizing the reaction kettle, and then filtering, washing and drying the resulted polymer, to obtain polyvinyl chloride;

wherein, the VCM monomer and water are in a ratio by mass of 1:1, and the temperature of water is 25-98° C.;

in relative to mass of the vinyl chloride monomer, the amount of the first suspension agent added, the amount of the second suspension agent added, the amount of the suspension stabilizer added, and the amount of the initiator composite added are as shown in Table 1.

PVC of each specifications prepared in Example 1 was subjected to three groups of tests. The specific amounts of components and the reaction conditions and the reaction results are as shown in Table 1.

TABLE 1

| PVC specifications | K57 Hard injection molding | | | K65 Pipe grade | | | K67 Extrusion grade | | | K70 Soft product | | |
|---|---|---|---|---|---|---|---|---|---|---|---|---|
| Testing | T1 | T2 | T3 | T4 | T5 | T6 | T7 | T8 | T9 | T10 | T11 | T12 |
| Primary PVA1 & 2 (ppm) | 850 | 870 | 900 | 990 | 1050 | 1150 | 825 | 850 | 895 | 990 | 1000 | 1200 |
| Appak Nano1000 (ppm) | 2900 | 3150 | 3280 | 2980 | 3120 | 3210 | 2900 | 3100 | 3200 | 2950 | 3000 | 3100 |
| Irispak system (ppm) | 2800 | 2900 | 3000 | 3250 | 3350 | 3500 | 3000 | 3150 | 3350 | 2200 | 2350 | 2500 |
| Irispak initial feeding, % | 1400 | 1450 | 1500 | 1625 | 1675 | 1750 | 1500 | 1575 | 1675 | 1100 | 1175 | 1250 |
| Irispak successive feeding, % | 1400 | 1450 | 1500 | 1625 | 1675 | 1750 | 1500 | 1575 | 1675 | 1100 | 1175 | 1250 |

TABLE 1-continued

| PVC specifications | K57 Hard injection molding | | | K65 Pipe grade | | | K67 Extrusion grade | | | K70 Soft product | | |
|---|---|---|---|---|---|---|---|---|---|---|---|---|
| Testing | T1 | T2 | T3 | T4 | T5 | T6 | T7 | T8 | T9 | T10 | T11 | T12 |
| Reaction temperature (° C.) | 70 | 70 | 70 | 60 | 60 | 60 | 56 | 56 | 56 | 60 | 60 | 60 |
| Reaction time (min) | 267 | 248 | 260 | 251 | 255 | 250 | 246 | 240 | 240 | 342 | 342 | 324 |
| Temperature for adding water | Cold | Cold | Hot | Cold | Hot | Hot | Cold | Hot | Hot | Cold | Hot | Hot |
| If a buffer was used | No | No | No | No | No | No | No | No | No | No | No | No |
| If a killing agent was used | No | No | No | No | No | No | No | No | No | No | No | No |
| Operation of the reflux condenser | No | Yes | Yes | No | Yes | Yes | No | Yes | Yes | No | Yes | Yes |
| Injection of cooling water | Yes | Yes | Yes | Yes | Yes | Yes | Yes | Yes | Yes | Yes | Yes | Yes |
| Final conversion rate % | 90 | 91 | 92 | 91 | 91 | 91 | 89 | 89 | 91 | 89 | 90 | 91 |

Wherein, the primary PVA1 has an alcoholysis degree of 88%, the primary PVA2 has an alcoholysis degree of 72%, and the ratio by mass of these two is 1:3;

Appak Nano 1000 is a solution composed of zinc oxide, a nanopowder (consisting of magnesium hydroxide and aluminum hydroxide, which are in amount of 7-8% and 4% in water suspension, respectively; having particle size of 600-200 nm), and an organic acid salt (the organic acid salt is $Al_2Mg_{4.5}(OH)_{13}CO_3 \cdot xH_2O$), at a ratio by mass of 1:3:3;

the initial addition of Irispak and the successive addition of Irispak mean that the initiator composite is added in two portions: for the first time, 50% is added before the reaction: firstly adding a chloroformate and an propionic acid anhydride, and then a hydrogen peroxide and sodium hydroxide; for the second time, after the start of the reaction, the remaining initiator composite is added before the half-life of the previously added initiator composite: firstly adding the remaining chloroformate and the propionic acid anhydride, and then adding the remaining hydrogen peroxide and sodium hydroxide; these starting material will form the initiator composite in the kettle;

In the temperature at which water is added, cold refers to the water at normal temperature, and hot refers to the water at 50-60° C.

The results of the quality of the finished product PVC are tested, specifically, in accordance with the following steps:

100 g of PVC resin was mixed with 3.5 g of orgartotin and 1.5 g of epoxidized soybean oil (ESO); the obtained mixture was ground by using a Brabender Torque Rheometry for 6 minutes (The initial temperature of laboratory chamber is set at 175° C. and the rotor speed is 50 rpm), and then molded into a thin sample sheet by a laboratory press machine at the condition of 185° C. and 30 mPa for 10 minutes.

The thin sample sheet (ie, PVC spline) was sliced using a diamond knife at the impact of a simple beam. The sliced sample was observed and photographed by a JEM-1230 transmission electron microscope (JEOL Co., Japan), specifically, as shown in FIGS. 2-5. From FIGS. 2-5, it can be seen, that the active ingredient (nanopowder) enters or partially enters the interior of the particles, from the slice experiment of polyvinyl chloride particles, providing an objective and observable support for the improvement of its physical and chemical properties.

The thermal stability of PVC was mainly detected by Congo red analysis and thermogravimetric analysis (TGA), taking into account the steps of the Congo red analysis method described in DIN S3381. The change in color on the Congo red test paper was observed by gradually changed HCl, and the elapsed time was measured when the PVC resin is heated to 175° C.

The thermal degradation of PVC was measured using a Perkin-Elmer Pyrts-1 TGA heating analyzer at a temperature raising rate of 10° C./min under nitrogen condition. The "reverse feeding" mode was used to successfully carry out VCM suspension polymerization. The slurry and PVC resin are separated to obtain transparent water, indicating that Appak stabilizer nanoparticles can be effectively bonded to PVC particles.

As can be seen from the above, the thermal stability of the obtained PVC resin is longer than that of the pure PVC resin and increases with the increase of the Appak Nano1000. HCL derived from dehydrochlorination in the PVC chain has an automatic catalytic effect on the thermal degradation of PVC. Because the metal nanostabilizer enters the PVC resin, hydrogen chloride can be absorbed by the metal nanostabilizer, and react with the $CO_3^{2-}$ anion between the metal layers. Thus the degradation of PVC is prevented, and the time of thermal stability for PVC resin is increased.

The quality testing results of the produced PVC are as shown in Table 2.

Each of the quality testing results of the finished PVC given in Table 2 shows that each of products produced for all K values have reached fairly stable and satisfactory level with good a particle size distribution (for example, the testing result of the particle size distribution of PVC for K65 hard pipe is: D10=79.76 μm, D50=115.48 μm, D90=178.71

μm, D99=288.46 μm), high apparent density, and enhanced thermal stability (Congo red analysis). The major range of the assessment is to verify that whether the use of Irispak system technology (different initiation systems and components, shortened polymerization time, use of cold water, use of reflux condenser) has a negative influence on the major process, and whether it has a negative effect on the standard PVC characteristics. The answer is no negative influence and no negative effect existing.

be noted that the polymerization process can freely carry out cold water and hot water feeding at the start of the polymerization.

Example 2

This example provides a feeding apparatus for the above production method of polyvinyl chloride by suspension polymerization, the structure of which is as shown in FIG.

TABLE 2

| PVC specifications | K57 Hard injection molding grade | | | K65 Pipe | | | K67 Extrusion grade | | | K70 Soft product | | |
|---|---|---|---|---|---|---|---|---|---|---|---|---|
| Testing | T1 | T2 | T3 | T4 | T5 | T6 | T7 | T8 | T9 | T10 | T11 | T12 |
| Viscosity (ml/g) | 76 | 80 | 78 | 102 | 103 | 105 | 111 | 114 | 112 | 125 | 126 | 128 |
| apparent density (g/cm$^3$) | 0.560 | 0.562 | 0.595 | 0.505 | 0.515 | 0.510 | 0.570 | 0.590 | 0.591 | 0.492 | 0.495 | 0.491 |
| particle size >250 μm (%) | <2.2 | <2.1 | <2.1 | <0.5 | <0.6 | <0.55 | <2.1 | <1.9 | <2.2 | <0.52 | <0.6 | <0.58 |
| particle size >60 μm (%) | >91 | >95 | >93 | >91 | >93 | >94 | >94 | >96 | >93 | >97 | >94 | >93 |
| Plasticizer absorption (%) | 14 | 16 | 17 | 25 | 26 | 28 | 17 | 18 | 19 | 32 | 34 | 36 |
| Thermal stability (tendency) | High | High | Very high | Very high | Very high | Very high | High | Very high | Very high | High | High | Very high |
| Volatile content (%) | <0.31 | <0.19 | <0.23 | <0.11 | <0.29 | <0.28 | <0.43 | <0.41 | <0.41 | <0.32 | <0.29 | <0.28 |

Results of Final Polymerization Process:

In order to increase the yield of the reaction kettle, the polymerization water is added as it has reached a sufficient high temperature, and the specific polymerization temperature at the end of the addition of water is 50-75° C.

Compared with the use of conventional catalysts (slow), even with the use of rapid catalysts, the technical solution provided in present invention gives a significant improvement. When a rapid catalyst is contacted with water at a high temperature (usually around 90° C.), it would immediately produce a great amount of active free radicals which will be partially self-degraded, self-recombined, partially formed into glassy and/or low molecular weight polymeric particles. Thus, this problem will be further aggravated when it is desired to use the Irispak system instead of using a preformed rapid catalyst, because the composition of the produced Irispak system is very unstable, and the higher the temperature the faster decomposition. As a result, the reaction is irregular and the free radical distribution in the polymer particles is not uniform, resulting in unevenness in the particle size, porosity and molecular weight of the polymer itself. Surprisingly, by using the formulation of the present invention, none of the above problems arise when the water at a high temperature was added, this is primarily attributed to the successive feeding during the process of the polymerization reaction (50% was added firstly, and the remaining 50% was gradually added over 2-3 hours as the reaction progressed). A reflux condenser can be used at same time to keep the temperature of the polymerization reaction in an appropriate range, the reaction can be terminated by injection of cold water, and the final conversion rate is improved, which also bring more critical advantages. It is to 1. This feeding apparatus comprises: a peroxide vessel 1, a peroxide storage tank 2, a sodium hydroxide solution vessel 3, a sodium hydroxide solution storage tank 4, a chloroformate storage drum 5, an organic acid anhydride storage drum 6, a waste liquid tank 7, a washing tower 8, a box for automatic drums handling 9, and an inlet pipe for starting material water 10;

the peroxide vessel 1 is connected to the peroxide storage tank 2 by a first pump 101, and the peroxide storage tank 2 is connected to the inlet pipe for starting material water 10 by a first feeding pump 201;

the sodium hydroxide solution vessel 3 is connected to the sodium hydroxide solution storage tank 4 by a second pump 102, and the sodium hydroxide solution storage tank 4 is connected to the inlet pipe for starting material water 10 by a second feeding pump 202;

the chloroformate storage drum 5 and the organic acid anhydride storage drum 6 are arranged in the box for automatic drums handling 9, and the box for automatic drums handling 9 is provided with an exhaust ventilation device 11, a blower 12 and a vertical pump 103; the blower 12 is connected to the washing tower 8, and the vertical pump 103 is connected to the waste liquid tank 7;

the chloroformate storage drum 5 is connected to the inlet pipe for starting material water 10 by a third feeding pump 203, and the organic acid anhydride storage drum 6 is connected to the inlet pipe for starting material water 10 by a fourth feeding pump 204;

one end of the inlet pipe for starting material water 10 is used for inputting the starting material water and the other end is connected to the top of the reaction kettle, and various starting materials can be brought into the reaction kettle through the input water;

the bottom of the washing tower 8 is connected to the waste liquid tank 7;

the waste liquid tank 7 is provided with a sodium hydroxide inlet pipe 13;

the waste liquid tank 7 is connected to the outside of the device by a fourth pump 104.

In the practice of the production method of polyvinyl chloride by suspension polymerization, for example, the method according to example 1, the operation can be performed in the following manner:

the solutions of hydrogen peroxide and sodium hydroxide are added to the peroxide vessel 1 and the sodium hydroxide solution vessel 3, respectively, and when used, they are input into the peroxide storage tank 2 and the sodium hydroxide solution storage tank 4 respectively by the first pump 101 and the second pump 102; when they are required to be added to the reaction kettle, solutions of hydrogen peroxide and sodium hydroxide are added into the inlet pipe for starting material water 10 respectively by the first feeding pump 201 and the second feeding pump 202, and added through the inlet on top of the reaction kettle via the inlet pipe for starting material water 10;

chloroformate and the propionic acid anhydride are stored in the chloroformate storage drum 5 and the organic acid anhydride storage drum 6, respectively; when they are required to be added, chloroformate and the propionic acid anhydride are added into the inlet pipe for starting material water 10 respectively by the third feeding pump 203 and the fourth feeding pump 204, and added through the inlet on top of the reaction kettle via the inlet pipe for starting material water 10;

when the material concentration in the box for automatic drums handling 9 is too high, it can be adjusted by the blower 12 and the exhaust ventilation device 11; the generated waste liquid is collected and injected into the waste liquid tank 7 by the vertical pump 103, and is processed by the washing tower 8; the sodium hydroxide solution required for the washing tower 8 is added through the sodium hydroxide inlet pipe 13; the pipe on top of the washing tower 8 is connected to the incineration collection place for outputting the generated gas from washing; the bottoms of the waste liquid tank 7 and the washing tower 8 are connected to the waste liquid treatment device outside by the fourth pump 104 for further processing of the waste liquid.

What is claimed is:

1. A method of producing polyvinyl chloride by suspension polymerization, comprising:
    a) injecting a vinyl chloride monomer and water at 25° C. to 98° C. into a reaction kettle to obtain a water suspension, closing the reaction kettle, repeatedly and cyclically performing vacuum-pumping and cleansing with nitrogen, stirring, to evacuate oxygen in the reaction kettle;
    b) adding a first suspension agent and a second suspension agent into the reaction kettle, and then adding a suspension stabilizer and an initiator composite, to carry out the polymerization reaction;
    c) adding cooling water to terminate the polymerization reaction when the pressure in the reaction kettle is reduced to 3.5 bar or less; and
    d) evacuating and vacuumizing the reaction kettle, and then filtering, washing and drying the resulted polymer, to obtain polyvinyl chloride;
    wherein, the vinyl chloride monomer and water are in a ratio by mass of 1:3-1:0.5;
    the first suspension agent is a polyvinyl alcohol having an alcoholysis degree of 95-66%, and the second suspension agent is a polyvinyl alcohol having an alcoholysis degree of 80-60%;
    the starting materials of the initiator composite include chloroformate, peroxide, organic acid anhydride and sodium hydroxide in a ratio by mass of 3-7:0.5-1.5:0.5-2:2-4;
    the first suspension agent is added at an amount of 200-500 ppm, the second suspension agent is added at an amount of 800-1000 ppm, the suspension stabilizer is added at an amount of 2800-3300 ppm, the initiator composite is added at an amount of 2700-3600 ppm, relative to the mass of the vinyl chloride monomer.

2. The method according to claim 1, wherein the initiator composite is added in two portions:
    for the first time, 30% to 70% is added before the reaction: firstly adding a chloroformate and an organic acid anhydride, and then adding a peroxide and sodium hydroxide;
    for the second time, after the start of the reaction, the remaining initiator composite is added before the half-life of the previously added initiator composite: firstly adding the remaining chloroformate and the organic acid anhydride, and then adding the remaining peroxide and sodium hydroxide.

3. The method according to claim 1, wherein the first suspension agent is a polyvinyl alcohol having an alcoholysis degree of 88%, and the second suspension agent is a polyvinyl alcohol having an alcoholysis degree of 72%.

4. The method according to claim 1, wherein the chloroformate, the peroxide, the organic acid anhydride and sodium hydroxide in the initiator composite are in a ratio by mass of 5:1:1.5:3.

5. The method according to claim 1, wherein the vinyl chloride monomer and water are in a ratio by mass of 1:1.

6. The method according to claim 1, wherein the suspension stabilizer contains zinc oxide, a nanopowder and an organic acid salt compound, and the nanopowder contains magnesium hydroxide and aluminum hydroxide.

7. The method according to claim 6, wherein the amount of magnesium hydroxide is 4-12 wt % and the amount of aluminum hydroxide is 2-8 wt %, relative to the weight of the water suspension, and the zinc oxide, the nanopowder and the organic acid salt compound are in a ratio by mass of 1:3:3.

8. The method according to claim 7, wherein the amount of magnesium hydroxide is 7-8%, the amount of aluminum hydroxide is 4%, relative to weight of the suspension of water and the monomer.

9. The method according to claim 6, wherein the organic acid salt compound has a structural formula:

$[M^{2+}_{1-x}M^{3+}_x(OH)]^{x+}(A^{n-}_{x/n}) \cdot yH_2O$ $M^{2+}$ represents a divalent metal cation selected from the group consisting of Mg, Ca, Zn, and Co;
$M^{3+}$ represents $Al^{3+}$ or $Bi^{3+}$;
$A^{n-}$ represents an anion having a valence of 1 to 4 and includes $HCO_3^-$, $Cl^-$, $CO_3^{2-}$ or $CH_3COO^-$;
x and y are numbers in the following ranges: $0.2 < x < 0.33$ and $y > 0$.

10. The method according to claim 1, wherein the method further comprises adding a primary dispersant and a secondary dispersant;
    the primary dispersant is a polyvinyl alcohol having an alcoholysis degree of 80-72.5%;

and the primary dispersant is added at an amount of 800-1500 ppm, relative to the weight of the water suspension;

the secondary dispersant is a polyvinyl alcohol having an alcoholysis degree of 35-55%.

11. The method according to claim 10, wherein the primary dispersant is added in a), and the secondary dispersant is added in b).

12. The method according to claim 1, wherein the chloroformate has a molecular formula of $ClCOOR_1$, wherein $R_1$ is methyl, ethyl, isopropyl, m-propyl or 2-ethyl;

the organic acid anhydride has a molecular formula of $(RCO)_2O$, wherein R is methyl or ethyl;

the peroxide is hydrogen peroxide and/or sodium peroxide.

13. The method according to claim 12, wherein the organic acid anhydride comprises propionic anhydride, and/or isopropionic anhydride.

14. The method according to claim 12, wherein the starting materials of the initiator composite comprise ethyl chloroformate, hydrogen peroxide, propionic anhydride and sodium hydroxide.

15. The method according to claim 12, wherein the m-propyl is 1-propyl.

16. The method according to claim 1, wherein the vacuum-pumping in d) is carried out at 42-48 mbar, 33-37° C. for 45 minutes, the washing is carried out by using reverse osmosis water, and the temperature for drying is 50-60° C.

17. The method according to claim 1, wherein an anti-sticking-to-kettle agent is first added to the reaction kettle prior to the addition of the vinyl chloride monomer and water.

18. A feeding apparatus for producing polyvinyl chloride by suspension polymerization, comprising: a peroxide vessel, a peroxide storage tank, a sodium hydroxide solution vessel, a sodium hydroxide solution storage tank, a chloroformate storage drum, an organic acid anhydride storage drum, a waste liquid tank, a washing tower, a box for automatic handling of drums contained therein, and an inlet pipe for starting material water;

the peroxide solution vessel is connected to the peroxide storage tank by a first pump, and the peroxide solution storage tank is connected to the inlet pipe for starting material water by a first feeding pump;

the sodium hydroxide solution vessel is connected to the sodium hydroxide solution storage tank by a second pump, and the sodium hydroxide solution storage tank is connected to the inlet pipe for starting material water by a second feeding pump;

the chloroformate storage drum and the organic acid anhydride storage drum are arranged in the box for automatic handling of the drums, wherein the box is provided with an exhaust ventilation device, a blower and a vertical pump; the blower is connected to the washing tower, and the vertical pump is connected to the waste liquid tank;

one end of the inlet pipe for starting material water is used for inputting the starting material water, and the other end thereof is connected to the top of a reaction kettle;

the chloroformate storage drum is connected to the inlet pipe for starting material water by a third feeding pump, and the organic acid anhydride storage drum is connected to the inlet pipe for starting material water by a fourth feeding pump;

the bottom of the washing tower is connected to the waste liquid tank;

the waste liquid tank is provided with a sodium hydroxide inlet pipe;

the waste liquid tank is connected to the outside of the apparatus by a fourth pump.

19. The feeding apparatus according to claim 18, wherein the washing tower has a first pipeline connected to an incineration collection place outside the feeding apparatus, and a second pipeline connected to a waste liquid treatment device outside the feeding apparatus.

20. The feeding apparatus according to claim 18, wherein the waste liquid tank is connected to a press-filter device outside the feeding apparatus by the fourth pump.

* * * * *